(12) United States Patent
Doll et al.

(10) Patent No.: US 11,273,688 B2
(45) Date of Patent: Mar. 15, 2022

(54) OUTLET DEVICE

(71) Applicant: Faurecia Innenraum Systeme GmbH, Hagenbach (DE)

(72) Inventors: Volker Doll, Ranschbach (DE); Linda Panze, Ochtendung (DE)

(73) Assignee: FAURECIA INNENRAUM SYSTEME GMBH, Hagenbach (DE)

( * ) Notice: Subject to any disclaimer, the term of this patent is extended or adjusted under 35 U.S.C. 154(b) by 497 days.

(21) Appl. No.: 15/985,829

(22) Filed: May 22, 2018

(65) Prior Publication Data

US 2018/0334015 A1 Nov. 22, 2018

(30) Foreign Application Priority Data

May 22, 2017 (DE) .................. 10 2017 004 928.9

(51) Int. Cl.
*B60H 1/34* (2006.01)

(52) U.S. Cl.
CPC .......... *B60H 1/3414* (2013.01); *B60H 1/345* (2013.01); *B60H 2001/3478* (2013.01)

(58) Field of Classification Search
USPC ....................................................... 454/155
See application file for complete search history.

(56) References Cited

U.S. PATENT DOCUMENTS

| | | | | |
|---|---|---|---|---|
| 3,420,448 A * | 1/1969 | Snow | ................ | F24F 13/1426 239/569 |
| 3,835,759 A * | 9/1974 | Lloyd | ................ | B60H 1/3442 454/154 |
| 5,338,252 A * | 8/1994 | Bowler | ................ | B60H 1/3421 454/155 |
| 6,780,098 B2 * | 8/2004 | Nishida | ................ | B60H 1/3414 454/155 |
| 10,099,536 B2 * | 10/2018 | Albin | ................ | B60H 1/3421 |
| 10,220,683 B2 * | 3/2019 | Sano | ................ | B60H 1/3442 |
| 2004/0219874 A1 * | 11/2004 | Karadia | ................ | B60H 1/3421 454/155 |
| 2008/0119125 A1 * | 5/2008 | Guerreiro | ................ | B60H 1/345 454/75 |
| 2014/0357178 A1 * | 12/2014 | Doll | ................ | F24F 13/072 454/284 |
| 2014/0357179 A1 * | 12/2014 | Londiche | ................ | F24F 13/075 454/322 |
| 2015/0202946 A1 * | 7/2015 | Inagaki | ................ | B60H 1/3442 454/154 |

(Continued)

FOREIGN PATENT DOCUMENTS

| | | |
|---|---|---|
| DE | 102007019602 | 4/2007 |
| DE | 102013210053 | 5/2013 |

(Continued)

*Primary Examiner* — Edelmira Bosques
*Assistant Examiner* — Frances F. Hamilton
(74) *Attorney, Agent, or Firm* — Finch & Maloney PLLC

(57) ABSTRACT

An outlet device for ventilating a vehicle interior is provided. The outlet device includes a housing with an inner housing surface, a first air-guide surface for a first partial volume flow, and a second air-guide surface for a second partial volume flow. The second air-guide surface lies contrary to the first air-guide surface and a rudder, which is disposed in the housing, and can be rotated around a rudder adjustment axis.

10 Claims, 4 Drawing Sheets

(56) References Cited

U.S. PATENT DOCUMENTS

| | | | |
|---|---|---|---|
| 2016/0101668 A1* | 4/2016 | Doll | F24F 13/072 |
| | | | 454/155 |
| 2016/0200178 A1* | 7/2016 | Londiche | C22C 38/06 |
| | | | 454/154 |
| 2016/0250909 A1* | 9/2016 | Schneider | B60H 1/3421 |
| | | | 454/155 |
| 2017/0190242 A1* | 7/2017 | Doll | B60H 1/3421 |
| 2018/0056756 A1* | 3/2018 | Schaal | B60H 1/3414 |
| 2018/0319255 A1* | 11/2018 | Bastian | B60H 1/3414 |

FOREIGN PATENT DOCUMENTS

| | | | |
|---|---|---|---|
| DE | 102015017009 | 12/2015 | |
| FR | 3083850 A1 * | 1/2020 | B60H 1/3414 |

* cited by examiner

OUTLET DEVICE

RELATED APPLICATIONS

This application claims priority under 35 U.S.C. § 119 to German Application No. DE 10 2017 004 928.9, filed May 22, 2017, which is hereby incorporated herein by reference in its entirety.

BACKGROUND

Technical Field

The disclosure relates to an outlet device for ventilating a vehicle interior.

Background Discussion

From U.S. Pat. No. 383,579A a vent nozzle is known.

SUMMARY

It is an object of the invention to provide an exhaust device for introducing air into a vehicle interior, which is formed by a relatively simple construction and which allows different designs.

These objects are achieved by the features of the independent claims. Further embodiments are given in the dependent on these dependent claims.

According to the invention, an outlet device is provided for ventilating a vehicle interior by generating an outlet flow. The outlet device comprises a housing and a rudder which is rotatably mounted in the same.

According to the invention, in particular, an outlet device is provided for ventilating a vehicle interior by generating an outlet flow, the outlet device comprising:
- a housing with an inner housing surface which forms a channel and which extends between an air inlet opening and an air outlet opening,
- a first air-guide surface which together with a first inner surface section which lies opposite the same forms a first air channel which defines a first partial volume flow direction which exits at the air outlet opening,
- a second air-guiding surface which is oriented opposite to the first air-guiding surface, wherein the second air-guiding surface together with a second inner surface section of the housing surface which lies opposite to the same forms a second air channel, wherein the second air channel defines a second partial volume flow direction which exits at the air outlet opening, wherein the first partial volume flow direction and the second partial volume flow direction meet each other in an intersection point area lying outside the housing,
- a rudder which is disposed in the housing and can be rotated around a rudder adjustment axis and which is adjustable in a first rotational position in which both the first air channel and the second air channel is closed and a second rotational position in which both the first air channel and the second air channel is opened.

In the embodiments of the outlet device according to the invention it can be provided that the rudder adjustment axis extends in a central portion of the rudder located between a first side portion and a second side portion.

In the embodiments of the outlet device according to the invention it can be provided that at the rotational positions of the rudder, in which both the first air channel and the second air channel is closed, outer edge portions of the side sections of the rudder contact abutment devices which are formed on opposite portions of the inner housing surface.

In the embodiments of the outlet device according to the invention it can be provided that wherein the outlet device comprises a central body which comprises the first air-guide surface and the second air-guide surface in each case as opposed outer surfaces.

In the embodiments of the outlet device according to the invention with a central body it can be provided that the rotation axis of the rudder is located in front of the center body as viewed from the air inlet opening.

In the embodiments of the outlet device according to the invention with a central body it can be provided that the central body is formed as a displacement body, which is formed in a convex manner in the direction of view from outside the central body in the direction of air inlet opening to the air outlet opening. It can also be provided that a surface section of the central body which is oriented transversely to the housing axis forms a convex form.

In the embodiments of the outlet device according to the invention with a central body it can be provided that the housing comprises an inlet section with the air inlet opening and an outlet section with the air outlet opening, wherein the central body is located in the outlet section and wherein the rudder extends into the inlet section.

In the embodiments of the outlet device according to the invention it can be provided that the outlet device comprises a rudder adjustment device coupled to the rudder for rotating the rudder about the rudder adjustment axis.

In the embodiments of the outlet device according to the invention it can be provided that the outlet device comprises at least one vertical fin, each rotatable by means of a pivot bearing providing a respective fin adjustment axis on the housing, which runs transversely to the rudder adjustment axis. According to one embodiment of the outlet device according to the invention, in this case it is provided that at least one of the at least one vertical fin comprises an outer edge section facing the air inlet opening, which, when viewed from the air inlet opening, is concavely curved in order to form a recess into which outer edge sections of the side portions of the rudder extend in predetermined rotational position ranges of the rudder. Preferably, the at least one vertical fin comprises a cutout within which a side portion of the rudder is movable. Because of the fact that this allows a relatively large surface of the rudder, a compact outlet device can be realized.

In embodiments of the invention in which the outlet device comprises a central body, the same is fixed immovably in the housing. According to the invention, a rudder is used to adjust the direction of the outlet flow mainly by changing the ratio of the volume flows of the two channels as well as in a final position to achieve a complete closure of the air flow inside the outlet device. Thus, two functions are provided with the rudder. This results in a much smaller space requirement for adjustment flaps and consequently the complete outlet device. Furthermore, the savings of components and thus a substantial part of the costs are achieved.

According to the invention, an external air flow resulting from the collision of two flows from two air channels is provided. The outlet device may be configured such that, due to an inlet flow, within the outlet device two flows or two partial flows are formed which, depending on the use of the flows inside the vehicle, are directed towards each other, in particular at an acute angle and especially at an angle less than 60 degrees or less than 45 degrees, and deflect each other after exiting the housing. In the presence of a central body, the two flows may be two partial volume flows of an air inlet flow separated from one another by the central body. The direction of the outer air flow depends on the respective amounts of air flow provided by the channel sections, which are influenced by the position or attitude of the rudder in the inlet air flow. In case that the flows provided by the two air channel portions are equal to each other, the resultant direction is a middle direction of the outward directions of the channels. In case that the flow rate in one channel section is less than that at the other passage section, the resulting outside air flow has a direction closer to the outlet direction of the other passage section.

Herein, the term "along" with respect to a reference direction or a reference axis, particularly in connection with the indications of a specific direction or specific axis generally, means that the specific direction or axis deviates locally at least with a maximum angle of 45 degrees, and preferably by a maximum angle of 23 degrees, from the reference direction or reference axis.

Herein, the term "transverse" with respect to a reference direction or a reference axis, particularly in connection with the indications of a specific direction or specific axis generally, means that the specific direction or axis deviates locally by an angle that is between 45 degrees and 135 degrees, and preferably by an angle that is between 67 degrees and 113 degrees, from the reference direction or reference axis.

Herein, the end portion of the outlet flow channel is specifically defined to have a length that, when projected along the housing centerline, is at least ½₀ of the smallest diameter of the inner housing surface at the air outlet opening at the second end.

According to one embodiment of the outlet device according to the invention, the extensions of flow contour lines generated at the location of the air outlet opening, which run in a housing center line, meet in an intersection area B of the first reference plane E1. In particular, the outlet device may be designed such that the position of the intersections is located at a distance from the air outlet opening which is at least a tenth and especially a quarter of the smallest diameter of the inner housing surface at the air outlet opening. Furthermore, in this combination, or generally in each embodiment of the invention, the point of intersection is located at a distance from the air outlet opening which is at most ten times the smallest diameter of the inner housing surface at the air outlet opening.

BRIEF DESCRIPTION OF DRAWINGS

Embodiments of the invention will now be described with reference to the accompanying drawings, in which.

DETAILED DESCRIPTION

Figure 1:
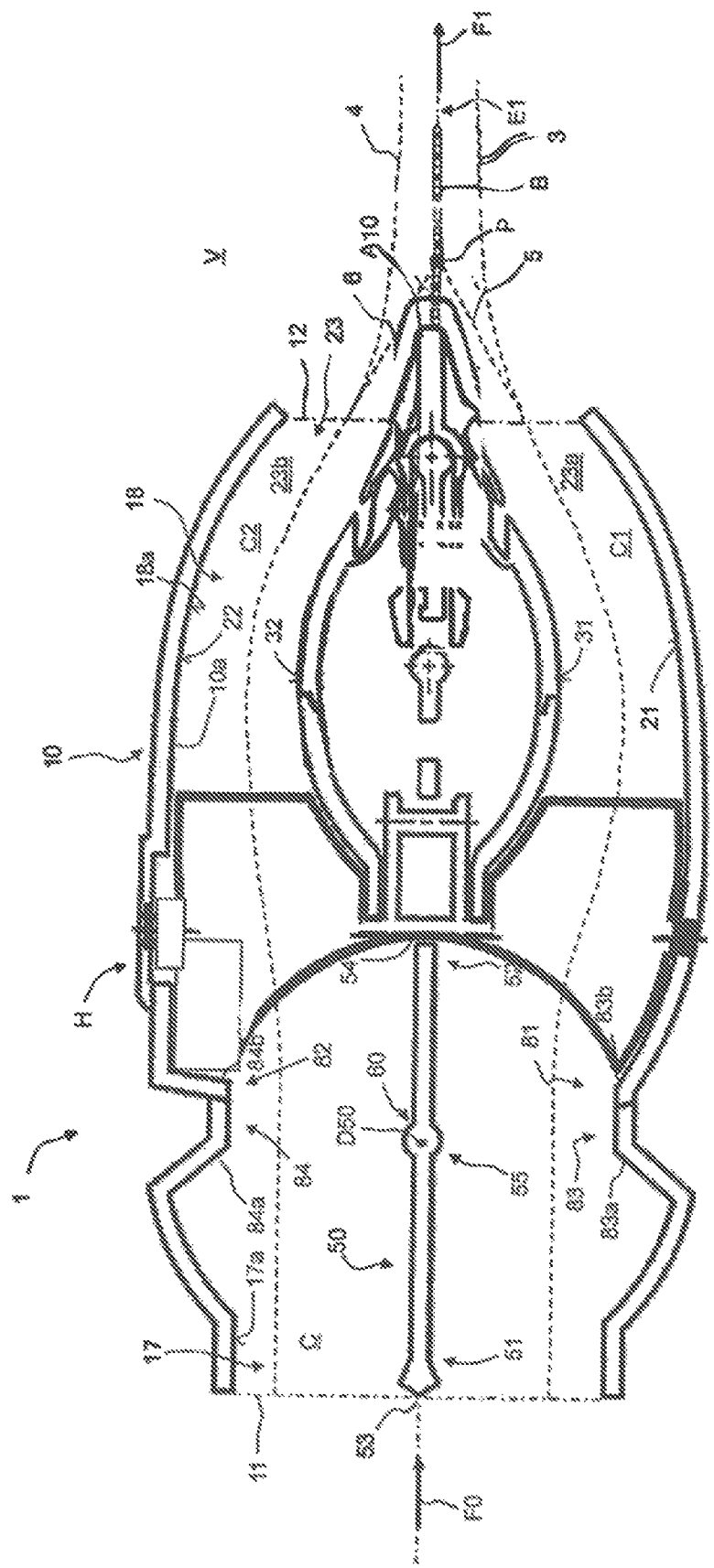
FIG. 1 shows a sectional view of a first sectional plane E1 of an embodiment of the outlet device according to the invention, wherein the outlet device comprises a housing, a central body arranged therein, a rudder which is rotatably mounted therein, which is located in a first air passage position.

An embodiment of the exhaust device 1 according to the invention for ventilating a vehicle interior V is shown in the figures. The outlet device 1 comprises a housing device H comprising a housing 10 with an inner housing surface 10*a* defining a channel C which extends along a housing centerline A10 of the housing 10. The housing 10 with the channel C forms an air inlet opening 11 at a first axial end 11*a* of the housing 10 and an air outlet opening 12 at a second axial end 12*a* of the housing 10, which is located opposite to air inlet opening 11 when viewed in the housing center line A10. The housing center line A10 may be defined as a connecting line of the centroids of the air inlet opening 11 and the air outlet opening 12. In this regard, the housing 10 has an inlet section 17 with an inlet section surface 17*a* on its inner side and an outlet section 18 with an outlet section surface 18*a* on its inner side, wherein the outlet section 18 is connected to the inlet section surface 17*a* in the direction of view in the housing center line A10, i.e. is fluidically connected with the same. The inlet section surface 17*a*, which forms the first axial end 11*a* with the air inlet 11, and the outlet section surface 18*a*, which has the second axial end 12*a* with the air outlet 12, form the inner casing surface 10*a*. The inlet section 17 forms the air inlet opening 11 and the outlet section 18 forms the air outlet opening 12, which is situated in the direction of the housing center line A10 of the housing 10 opposite the air inlet opening 11.

In particular, the outlet section 18 may be formed as an air-guide surface with a flow contour.

The air inlet opening 11 can be designed in different ways. For example, the air inlet opening 11 seen in the housing center line A10 of the housing 10 may be oval or round or substantially rectangular, in particular rectangular with rounded corner edge portions, or elongated.

In each of the mentioned shapes of the air inlet opening 11, the air outlet opening 12 may be designed in different ways. For example, the air outlet opening 12 seen in the housing center line A10 of the housing 10 may be oval or round or substantially rectangular, in particular rectangular with rounded corner edge portions, or elongated.

The inner housing surface 10*a* comprises an end section 23 of the outlet section 18, which forms the air outlet opening 12. The end section 23 is formed by respective sections 23*a*, 23*b* opposing each other with respect to a first reference plane E1.

The extensions of the flow contour lines running in the housing center line A10 meet in an intersection point area B of the first reference plane E1, wherein the intersection point area B is located outside the housing 10 on the side of the air outlet opening 12. In the representation of FIG. 1, the first sectional plane for generating this sectional view runs vertically to the first reference plane E1.

The outlet device 1 comprises a first air-guide surface 31, which together with a first inner surface section 21 of the housing 10 which lies opposite to the first air-guide surface 31 forms a first outlet subsection of the channel C which is designated as first air channel C1. The outlet device 1 further comprises a second air-guide surface 32 which lies opposite to the first air-guide surface 31 and which together with a second inner surface section 22 of the housing 10 which lies opposite to the second air-guide surface 32 forms a second outlet subsection of the channel C which is designated as second air channel C2. Upon entry of an inlet flow F0 through the air inlet opening 11, a first partial volume flow flows through the first outlet section C1 and a second partial volume flow flows through the second outlet section C2. Thus, the first air channel C1 provides a first partial volume flow exiting at the air outlet opening 12 and the second air channel C2 provides a second partial volume flow exiting at the air outlet opening 12.

In particular, the first inner surface portion 21 and the second inner surface portion 22 of the inner housing surface 10a of the housing 10 may be concavely curved at least in sections and in particular in the region of the exit portion 18 or the end portion 23 viewed from the housing center line A10, wherein the direction of the courses of the contour lines which run in the direction of the housing center line A10 are directed at an angle to the first reference plane E1 and are directed towards the same. As a result, the first and second partial volume flow exiting at the air outlet opening 12 are each given a direction at the air outlet opening 12 which runs at an angle to the first reference plane E1. As a result, the first air channel C1 or the first outlet subsection of the channel C defines a first partial volume flow or a first outlet flow component exiting at the air outlet opening 12 and the second air channel C2 or second outlet subsection of the channel C defines a second partial flow or a second outlet flow component exiting at the air outlet opening 12 exiting, which respectively exit from the air outlet opening 12 in flow directions, which meet outside of the housing 10 in an intersection point region B. This area can be defined, in particular, as an intersection point area B situated outside the housing 10, which is located in the first reference plane E1.

The first air-guide surface 31 may be formed as an outer surface of a central body 30, which, together with the first inner surface section 21 of the housing 10 lying opposite thereto, forms a first air channel C1 or first outlet subsection of the channel C. Furthermore, the second air-guide surface 32 may be formed as an outer surface of the central body 30, which, together with the second inner surface portion 22 of the housing 10 lying opposite thereto, forms a second air channel C2 or second outlet section of the channel C. The first and the second air-guide surface 31, 32 are outer surfaces of the central body 30, which are lying opposite to each other and are directed completely or at least in sections transversely to the first reference plane E1.

The central body 30 may be formed in particular as a hollow body. The central body 30 is at least partially located in the outlet section 18 of the housing 10 with respect to the housing center line A10, i.e. viewed transversely thereto.

According to one embodiment of the central body 30, the same is formed as a displacement body, which is formed in a convex manner viewed in the viewing direction from outside the displacement body 30. In this case, the first and the second air-guide surface 31, 32 seen in the viewing direction from outside the displacement body 30 are formed in a convex manner.

The outlet device 1 according to the invention further comprises a rudder 50, which is arranged at one end of the central body 30 facing the air inlet opening 11.

The rudder 50 is mounted rotatably about a rudder adjustment axis D50 in the housing 10. For this purpose, the rudder 50 can be pivoted to the housing by means of a rotary bearing device 60. The extension direction of the first reference plane E1 preferably extends in and across the rudder adjustment axis D50. In this context, the outlet section 18 may be defined such that it extends over at least 30% and in particular at least 50% of the distance between the rudder adjustment axis D50 and the air outlet opening 12 and from this.

According to one embodiment of the outlet device 1, the rudder adjustment axis D50 is located in the region of the inlet section 17.

According to one embodiment of the outlet device 1, the central body 30 extends transversely across the entire flow channel C in the direction of the first reference plane E1, i.e. from a first side wall 18a to a second side wall 18b of the outlet section 18 which lies opposite thereto, and is connected to the side walls 18a, 18b, so that two separate air channels C1, C2 are formed in the outlet section 18 as outlet subsections of the channel C. In this case, the central body 30 is fixed to the housing 10 and attached to the same, this means that the same is arranged in its position relative to the housing 10 immovable.

According to one embodiment, the rudder adjustment axis D50 extends in a central portion 55 through the rudder 50, between a first side portion 51 and a second side portion 52. The side portion 51, 52 and the central portion 55 are defined such that the same extend in the direction of the rudder adjustment axis D50 through the rudder 50. The first side portion 51 comprises a first outer edge portion 53 defining a first outer end as viewed from the rudder adjustment axis D50, and the second side portion 52 comprises a second outer edge portion 54 as viewed from the rudder adjustment axis D50, wherein the first end is located opposite to the second end. The central portion 55 may be defined as a surface portion that intersects the middle third of the largest distance between points of the first and second ends.

Since the rudder 50 can take different rotational positions, the same acts as a flow adjustment part.

In one embodiment of the outlet device, the rudder 50 can be rotatable between two end positions, in which in each case, in case that the first air guide 31 and the second air-guide surface 32 are in a fixed position relative to the housing 10, both the first air channel C1 and the second air channel C2 are closed. This can be realized in particular by the fact that the housing surface 10a comprises abutment areas 81, 82 which are lying opposite to each other with respect to the first reference plane E1, respectively. Each abutment device 83, 84 comprises a first abutment surface section 83a or 84a and a second abutment surface section 83b or 84b.

Figure 4:
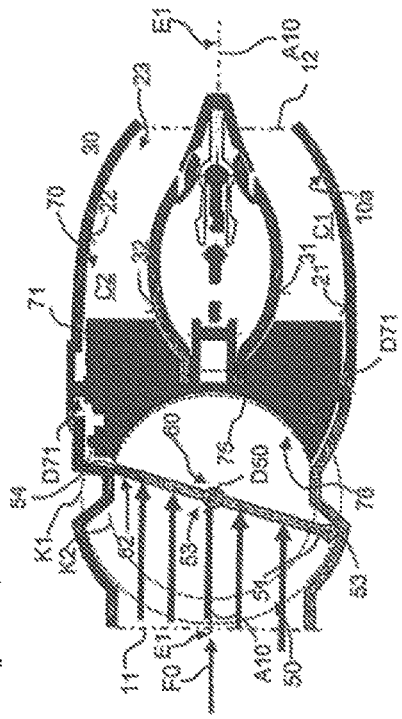
FIG. 4 shows the embodiment of the outlet device according to the FIG. 3 in the sectional view thereof, wherein the rudder is in a first end position.
Figure 6:
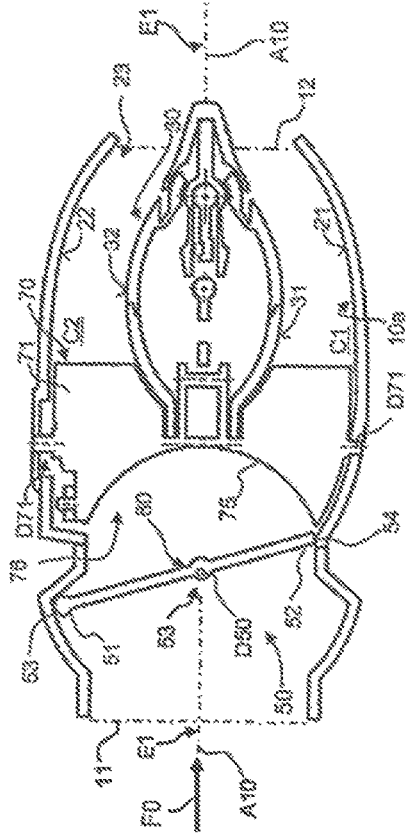
FIG. 6 shows the embodiment of the outlet device according to FIG. 3 in the sectional view of the same, wherein the rudder is in a second end position.
Figure 7:
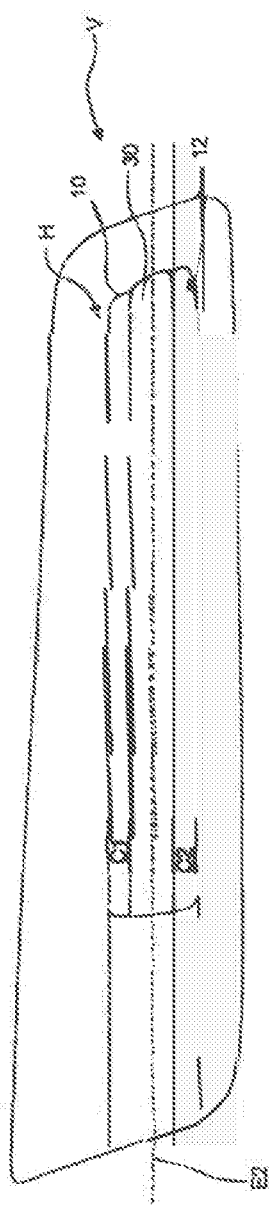
FIG. 7 shows a front view of the outlet device, which is integrated in an instrument panel.

The course of the first abutment surface section 83a, 84a is designed such that the first abutment surface section 83a, 84a, at a corresponding rotational position of the rudder 50, provides an abutment for the first side portion 51 or the first outer edge portion 53 of the rudder 50, in case that the same with in a rotation of the rudder 50 is moved from the air inlet opening 11 forth to the respective first abutment surface section 83a, 84a up to the stop (FIGS. 4 and 6). In an analogous manner, the courses of the second abutment surface sections 83b, 84b are designed such that the second abutment surface sections 83b, 84b, at a corresponding rotational position of the rudder 50, provides an abutment and in particular a planar contact for the second side portion 52 or the second outer edge portion 54 of the rudder 50, in case that the same within a rotation of the rudder 50 is moved from the air outlet opening 12 forth to the respective second abutment surface section 83b, 84b up to the stop (FIGS. 4 and 6).

Thus, especially in the end positions which are shown in FIGS. 4 and 6, the first outer edge portion 53 of the rudder 50, seen in the direction of the housing center line A10, can be arranged completely or at least partially overlapping with the respective first abutment surface section 83a, 84a and contacting the same. It can also be provided that, in the end positions, the second outer edge portion 54 of the rudder 50, seen in the direction of the housing center line A 10, is arranged completely or at least partially overlapping with the respective second abutment surface section 83b, 84b and contacting the same.

Furthermore, as shown in FIG. 1, it may be provided that the lateral surface on that side of the rudder 50 which comprises the first outer edge portion 53 is larger than the lateral surface on that side of the rudder 50 which comprises the second outer edge portion 54. In this case, the respective lateral surface is limited on the one hand by the course of the rudder adjustment axis D50 and the other limited by the first outer edge portion 53 and the second outer edge portion 54, respectively. Upon rotation of the rudder 50, at a position in the rudder adjusting axis D50, a point of the first outer edge portion 53 moves on a portion of a circle K1 (FIG. 6). Also, upon rotation of the rudder 50, a point of the first outer edge portion 53 located at a position in the rudder pitch axis D50 moves on a portion of a circle K2 (FIG. 6). In case that the extension of the lateral surface having the first outer edge portion 53 is larger than the extension of the lateral surface having the second outer edge portion 54, the radius of the circle K1 is larger than the radius of the circle K2.

In this case, in each case that lateral surface may be defined as a lateral surface, which is visible in the direction through the air inlet opening 11 as a projection. As a result, when the respective larger lateral surface contacts a first abutment surface section 83a, 84a and is blown by the inlet flow F0, it is achieved that the rudder 50 remains in a respectively assumed end position without the intervention of other external forces, as long as air flows through the air inlet opening 11.

The first abutment surface section 83a, 84a may have a course along the rudder adjustment axis D50, wherein in a closed position (FIGS. 4, 6) the first outer edge portion 53 of the rudder 50 at least partially abuts flat against the first abutment surface section 83a or 84a or as seen in the direction of the housing center line A10 is overlapping with the same, e.g. at least 50% or more preferably at least 75% and especially 90% of the length of the first outer edge portion 53 in the rudder adjustment axis D50. The outlet device 1 can be designed such that in a closed position (FIGS. 4, 6) the second abutment surface section 83b, 84b additionally has a course along the rudder adjustment axis D50, in which the second outer edge portion 54 of the rudder 50 is lying at least in sections planar on the second abutment surface section 83b, 84b or seen in the direction of the housing center line A10 lying overlapping with the same, for example by at least 50% or more preferably by at least 75% and especially by 90% of the length of the first outer edge portion 53 in the rudder adjustment axis D50.

In the end positions of the rudder 50 shown in FIGS. 4 and 6, an inflow of air into the outlet section 18 is prevented.

In order to achieve an improved abutment of the outer edge portion 53 on the respective first abutment surface section 83a, 84a and a better prevention of throughflow, the outer edge portion 53 of the rudder 50 may comprise a cross-sectional widening, on which an edge line extending in the direction of the adjustment axis D50 is formed. The cross-sectional widening may be made of a relatively soft plastic, such as e.g. silicone, or consist of such. Also, for this purpose, at the outer edge portion 53 of the rudder 50, a sealing lip, which is made in particular from a relatively soft plastic, such as e.g. silicone, can be arranged.

FIG. 1 shows a neutral position of the rudder 50, in which the volume flows flowing through the first outlet section C1 and the first outlet section C1, respectively, have the same size. In FIG. 1, in order to illustrate the course and the direction of the first partial air flow occurring along the housing center line A10 in the first air channel C1 or first outlet section C1, a first flow line 3 extending in the direction of the housing center line A10 is shown. Furthermore, in order to illustrate the course and the direction of the second partial air flow occurring along the housing center line A10 in the second air channel C2 or second outlet section C2, a second flow line 4 extending in the direction of the housing center line A10 is shown. The direction of the first flow line 3, which results in the air outlet opening 12, is provided in FIG. 1 by reference numeral 5 and the direction of the second flow line 4, which results in the air outlet opening 12, is provided in FIG. 1 with reference numeral 6. The directions 5, 6 of the flow lines 3 and 4, respectively, meet at an intersection point P located within the intersection area B. The intersection area B is herein defined as the region of the first reference plane E1 in which the directions of all the flow lines of the first and second exit sections C1, C2 at the location of the air outlet opening 12 intersect the first reference plane E1 at any rotational positions of the rudder 50.

In the neutral position of the rudder 50 shown in FIG. 1, the outlet flow F1 exiting the air outlet opening 12 has a neutral direction, i.e. the same extends in the direction of the extent of the first reference plane E1.

Figure 3:
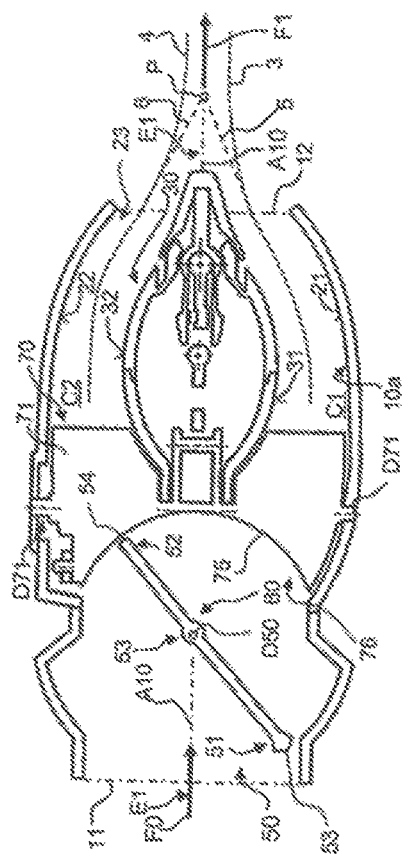
FIG. 3 shows the embodiment of the outlet device according to FIG. 1 in the sectional view of the same, wherein the embodiment shown here additionally has an arrangement of vertical fins compared to the embodiment of FIG. 1 and wherein the rudder is in a first intermediate position.

FIG. 3 shows the outlet device 1 with a rotational position of the rudder 50, in which the rudder 50 is rotated relative in the clockwise direction to the neutral rotational position of the rudder 50 according to FIG. 1 in the plan view thereof. As a result, the volume flow entering the first outlet section C1 of the channel C is increased in relation to the volume flow entering the second outlet section C2 of the channel C, so that the outlet flow is deflected relative to the direction of the housing center line A10 on the side the second outlet section C2.

Figure 5:
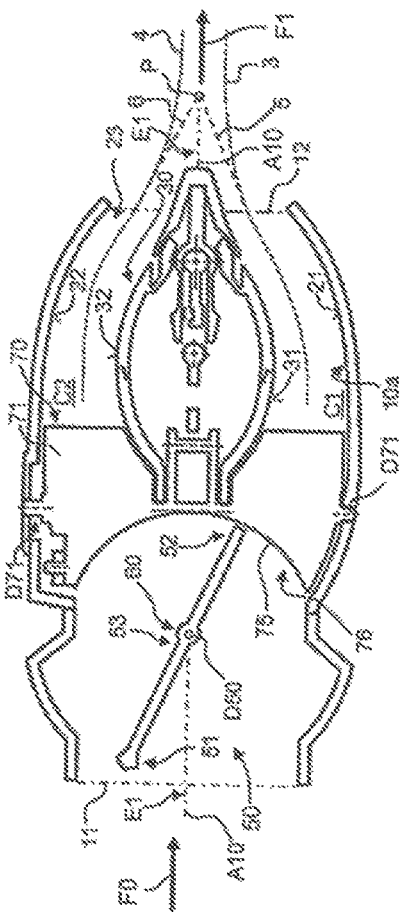
FIG. 5 shows the embodiment of the outlet device according to FIG. 3 in the sectional view of the same, wherein the rudder is in a further intermediate position.

FIG. 5 shows the outlet device 1 with a rotational position of the rudder 50, in which the volume flow entering the second outlet section C2 of the channel C is increased in relation to the volume flow entering the first outlet section C1 of the channel C, so that the outlet flow undergoes a deflection relative to the direction of the housing center line A10 to a different side compared to the state of FIG. 3.

The outlet device 1 according to the invention may further comprise a rudder adjustment device A50 which is coupled to an actuator device of the outlet device 1 and which can be operated by a user. Due to an actuation of the actuator device, the rudder is adjusted according to the operation by means of the adjustment device A50.

Figure 2:
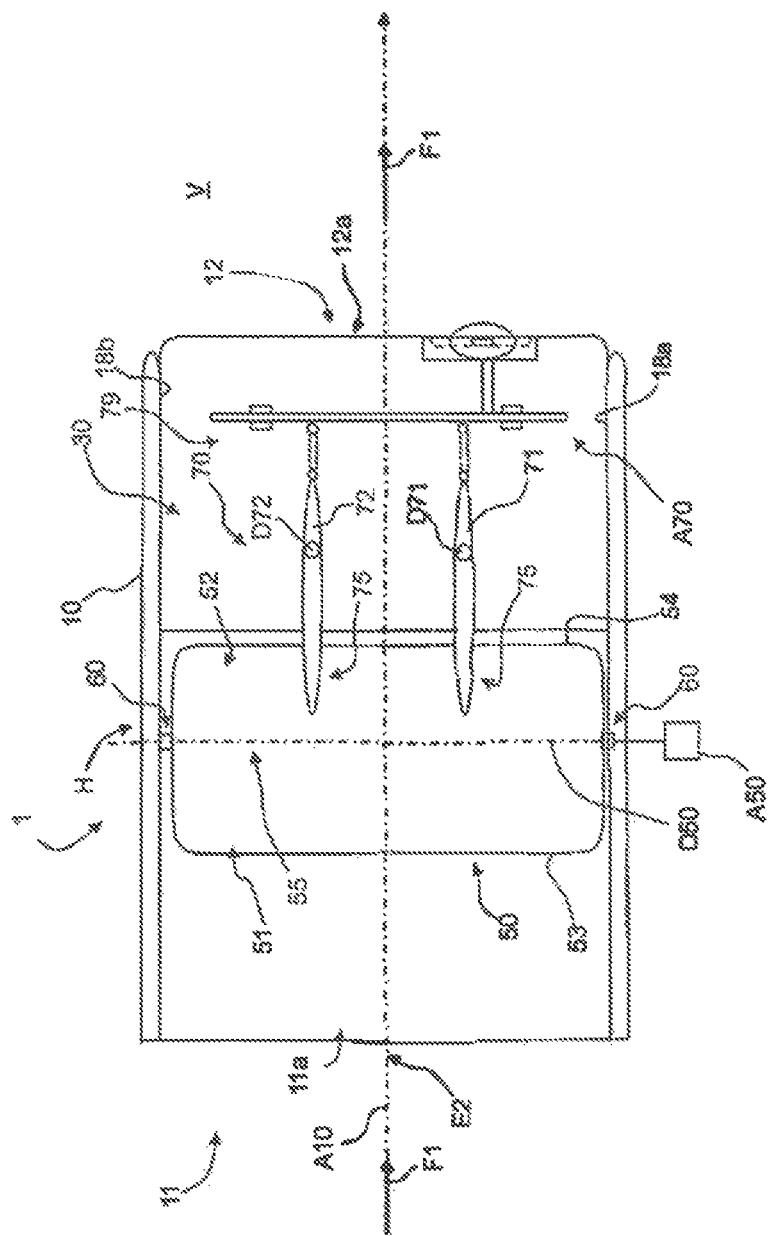
FIG. 2 shows a sectional view of a second sectional plane E2 of a variant of the embodiment of the outlet device according to FIG. 1, wherein the second sectional plane E2 extends vertically to the first sectional plane E1 and wherein the rudder is in the first air passage position, the embodiment shown here additionally has an arrangement of vertical fins relative to the embodiment of FIG. 1.

The outlet device 1 can also comprise an arrangement 70 of vertical fins 71, 72, which is shown schematically in FIG. 2. The vertical fins 71, 72 can be rotatably mounted on the housing 10 by means of rotary bearings D71, D72 with providing a respective fin-adjustment axis. The fin-adjustment axes are extending transverse and, in particular, vertical to the rudder adjustment axis D50.

Preferably, at least one of the vertical fins each comprise a cutout or a recess 76 and in particular the vertical fins each comprise a cutout or recess 76 within which a side portion of the rudder 50 is movable in a certain rotational position range of the same is and which protrudes into the cutout or a recess 76. The cutout 76 may have the shape of a circle segment, so that only a small gap exists between a moving rudder and the vertical fins. Thus, at least one of the at least one vertical fin 71, 72 comprises an outer edge section 75 which faces the air inlet opening 11 and which, viewed from the air inlet opening 11, is concave and in particular at least partially circularly curved, in order to form a recess, in which outer edge portions 53, 54 of the side portions 51, 52 of the rudder 50 extend in predetermined rotational position ranges of the rudder 50. In this case, it can be provided that the recess extends, when viewed from the air inlet opening 11 into a depth that—in a maximum or horizontal release position of the rudder 50 (analogous to the representation of FIG. 1)—the rudder 50, at least from a point in the direction to the rudder adjustment axis D50 extends into the recess 76 of the respective vertical fin 71, 72. In this case, it can further be provided that the rudder 50 extends by at least 10% and in particular by at least 30% and especially by at least 50% of the maximum distance between the respective first outer edge portion 53 or, in the embodiment of FIGS. 1 to 7, the second outer edge section 54 (FIGS. 1 to 7) and the rudder adjustment axis D50 into the recess 76 of the respective vertical fin 71, 72.

The outlet device 1 may have a fin coupling device 79, with which the vertical fins 71, 72 are guided to each other in their rotational positions, so that the vertical fins 71, 72 have the same rotational positions.

The outlet device 1 according to the invention may further comprise a fin adjustment device A70, with which the rotational positions of the vertical fins 71, 72 are adjustable.

In the case of a deflected or un-deflected state of the rudder 73 and by additionally rotating the vertical fins 71, 72, the direction F1 of the outlet airflow is changed, particularly when the deflected state of the rudder 50 remains constant. Thereby, different directions of the exhaust air flow into the vehicle interior V can be provided.

The invention claimed is:

1. An outlet device configured to ventilate a vehicle interior, the outlet device comprising:
   a housing with an inner housing surface, the housing forming a channel and extending between an air inlet opening and an air outlet opening;
   a first air-guide surface that together with a first inner surface section of the inner housing surface forms a first air channel that defines a first partial volume flow that exits at the air outlet opening, the first air-guide surface lying opposite the first inner surface section;
   a second air-guide surface that together with a second inner surface section of the inner housing surface forms a second air channel that defines a second partial volume flow that exits at the air outlet opening, the second air-guide surface being oriented opposite the first air-guide surface, the second air-guide surface lying opposite the second inner surface section, wherein the first partial volume flow and the second partial volume flow intersect at an area outside the housing; and
   a rudder that is disposed in the housing and that is rotatable around a rudder adjustment axis, the rudder being adjustable in a first rotational position in which both the first air channel and the second air channel are closed and a second rotational position in which both the first air channel and the second air channel are open, wherein the rudder adjustment axis extends in a central portion of the rudder located between a first side portion of the rudder and a second side portion of the rudder, the first side portion comprising a first end of the rudder and the second side portion comprising an opposite second end of the rudder, and wherein an angle between the first side portion and the second side portion remains constant during rotation of the rudder between the first rotational position and the second rotational position.

2. The outlet device according to claim 1, wherein the central portion of the rudder intersects a middle third of a largest distance between the first end of the rudder and the second end of the rudder.

3. The outlet device according to claim 1, wherein at the first rotational position, a first outer edge portion of the first side portion and a second outer edge portion of the second side portion contact at least one abutment formed on the inner housing surface.

4. The outlet device according to claim 1, wherein the outlet device comprises a central body that comprises the first air-guide surface and the second air-guide surface as opposed outer surfaces of the central body.

5. The outlet device according to claim 4, wherein the rudder is located in front of the central body as viewed from the air inlet opening.

6. The outlet device according to claim 4, wherein the central body comprises a displacement body formed in a convex manner as viewed from the air inlet opening.

7. The outlet device according to claim 4, wherein the housing comprises an inlet section with the air inlet opening and an outlet section with the air outlet opening, wherein the central body is located in the outlet section and wherein the rudder extends into the inlet section.

8. The outlet device according to claim 1, further comprising a rudder adjustment device coupled to the rudder for rotating the rudder about the rudder adjustment axis.

9. The outlet device according to claim 1, further comprising one or more vertical fins, each vertical fin of the one or more vertical fins being rotatable via a corresponding pivot bearing providing a respective fin adjustment axis on the housing that runs transversely to the rudder adjustment axis.

10. The outlet device according to claim 9, wherein at least one of the one or more vertical fins comprises an outer edge section facing the air inlet opening, that, when viewed from the air inlet opening, is concavely curved to form a recess into which outer edge sections of the first side portion and the second side portion extend in predetermined rotational position ranges of the rudder.

* * * * *